Feb. 16, 1971    G. W. COON    3,564,401
THERMALLY CYCLED MAGNETOMETER
Filed Aug. 16, 1965    4 Sheets-Sheet 1

INVENTOR.
GRANT W. COON
BY
ATTORNEYS

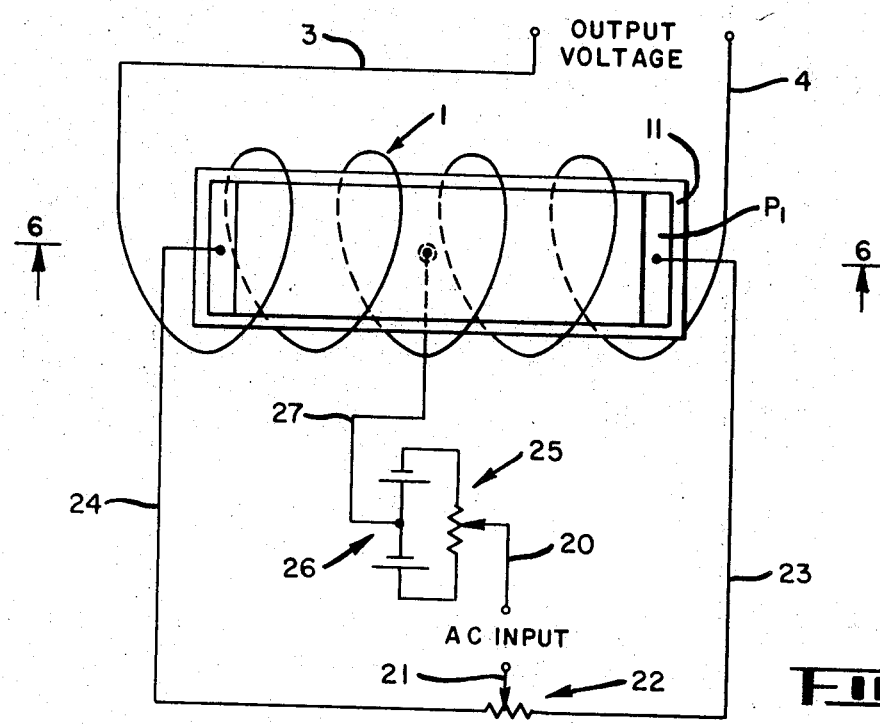
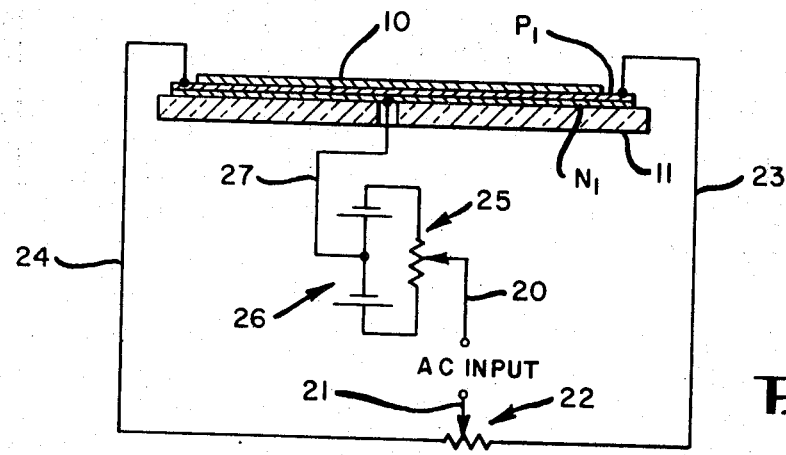
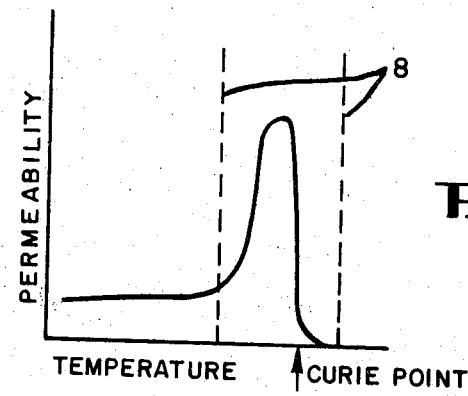

INVENTOR.
GRANT W. COON
BY
ATTORNEYS

INVENTOR.
GRANT W. COON

United States Patent Office 3,564,401
Patented Feb. 16, 1971

3,564,401
THERMALLY CYCLED MAGNETOMETER
Grant W. Coon, Palo Alto, Calif., assignor to the United States of America as represented by the National Aeronautics and Space Administration
Filed Aug. 16, 1965, Ser. No. 480,211
Int. Cl. G01r 33/02
U.S. Cl. 324—43                                        10 Claims

ABSTRACT OF THE DISCLOSURE

A magnetometer for measuring static and dynamic magnetic fields. A sensing coil surrounds a magnetic core. The temperature of the core is thermally cycled above and below the Curie temperature of the core thereby causing the permeability of the core to fluctuate. A voltage proportional to the magnetic field under test is induced in the sensing coil.

---

The invention described herein may be manufactured and used by or for the Government of the United States of America for governmental purposes without the payment of any royalties thereon or therefor.

This invention relates to measuring apparatus comprising a temperature sensitive measuring element and means for dynamically pulsing the thermal energy level of the measuring element. More particularly the invention relates to a magnetometer which operates on the principle of rapidly changing the temperature of the magnetic element in the magnetometer.

The broad object of this invention is to provide in measuring apparatus an arrangement that is capable of producing a rapid change in the temperature of a temperature-sensitive measuring element. In a preferred embodiment of the invention the measuring apparatus comprises a magnetometer having a strip of magnetic material forming a core surrounded by a sensing coil. The magnetic material is one which experiences a rapid change in permeability with relatively little change in temperature in a specific narrow temperature range, for example, the temperature range adjacent to the Curie point. The temperature known as the Curie temperature is the temperature in a ferrogmagnetic material above which the material becomes substantially nonmagnetic. A magnetometer according to the invention is operated by placing it in a magnetic field to be measured so that the lines of the field pass through the sensing coil. If the number of these flux lines passing through the coil can be made to vary, a current will be generated in the sensing coil, and if the variation is proportional to the strength of the field to be measured, the current generated will likewise be proportional and therefore a measurement of the field to be measured. In accordance with the invention, the number of flux lines passing through the coil is made to vary by changing the permeability of the magnetic core material by changing the temperature thereof in the described region of extreme temperature sensitivity. A magnetometer of the type described can be referred to by way of a short description as a temperature gated flux-gate magnetometer.

Flux-gate magnetometers broadly are not new. In the past one of the most practical types of flux-gate magnetometer has been a device known as a magnetically gated flux-gate magnetometer. In the magnetically gated flux-gate magnetometer the flux through the sensing coil is made to vary by immersing the magnetic core in an auxiliary magnetic field at right angles to the magnetic field to be measured. When the strength of the auxiliary field is varied it will vary the number of flux lines from the unknown field which can pass through the core. Thus, if the core is saturated by the auxiliary field, the flux through the coil in the direction of the unknown field will be of a low magnitude similar to what it would be if no magnetic core were in the coil. Then when the auxiliary field is reduced to zero the magnetic nature of the core will cause additional flux lines of the unknown field to pass through the coil.

Although the magnetically gated flux-gate magnetometer has proved very benefical in providing for the measurement of unknown magnetic fields, certain difficulties do exist, and these difficulties are removed by the temperature gated approach of this invention. More specifically, one of the problems is that of residual magnetization. If a flux-gate magnetometer designed to measure very low fields in the order of a gamma is subjected to a relatively large field which is subsequently removed, a portion of the flux usually remains in the core and this appears as an error in the output, making it impossible to measure the absolute value of the unknown outside field. The temperature gated magnetometer does not involve the use of any high strength auxiliary field which might leave residual magnetism in the core. In addition the temperature gated magnetometer cycles the core through a temperature point such as Curie temperature where substantially all the internal magnetization of the core is lost.

Another difficulty encounted with the magnetically gated flux-gate is that of maintaining the auxiliary field at exactly right angles to the sensing coil. If the relatively strong auxiliary or gating flux is not kept at right angles to the sensing coil, a certain component of the gating field will induce an error voltage in the sensing coil. Since the auxiliary field may be many orders of magnitude larger than the field to be measured, it is difficult to minimize this source of error. Since the temperature gated magnetometer does not involve a strong auxiliary magnetic field, the problem simply does not exist in the same magnitude. Further, the structure of the temperature gated magnetometer is such that it is easier to orient any stray magnetic field at right angles to the coil, and it is also possible to provide adjustments such as a potentiometer to neutralize any unwanted fields.

A further difficulty with the magnetically-gated magnetometer is that eddy currents from the strong alternating current magnetic field prevent penetration of such field, especially in high permeability magnetic materials, usually of low resistance. A transient of current produced upon opening or closing the highly inductive circuit of the auxiliary coil may have a large momentary direct current component that can cause a direct current penetrating magnetization of the core which will not be erased by the subsequent non-penetrating alternating current field.

Accordingly, a specific object of the invention is to provide an improved magnetometer which eliminates the difficulties mentioned in connection with the magnetically gated flux-gate magnetometer.

More specifically an object of the invention is to provide a flux-gate magnetometer in which the gating is provided by changing the temperature of the magnetic core.

In order to achieve a desirable degree of sensitivity and accuracy it is necessary that the temperature of the magnetic core be changed at a rapid rate. Thus, another object of the invention is to provide an arrangement that is capable of producing a rapid change in temperature and more particularly a rapidly oscillating temperature.

In accordance with a preferred embodiment of the invention, the Peltier effect is employed to obtain the desired temperature changes. As is well known by those skilled in the art, there are dissimilar types of thermoelectric materials such as P-type material and N-type material. When such dissimilar materials are electrically connected in series and a direct current is passed across the junction between them, said junction will become either heated or cooled depending on the direction of flow. This effect is known as the Peltier effect. Numerous proposals have been made for using the Peltier effect to provide heating or cooling on a relatively steady basis.

A further object of the invention is to provide a construction which employs the Peltier effect in a way which permits rapid thermal pulsing of a temperature sensitive measuring element.

An additional object of the invention is to provide a pressure gauge construction employing the Peltier effect for pulsing the thermal energy level of a temperature sensitive membrane employed to measure the pressure of a gas having a rapidly fluctuating temperature.

These and other objects and features of advantage will become more apparent from the following detailed description wherein reference is made to the accompanying drawings in which:

FIG. 4 is a graph similar to FIG. 3 but showing the characteristics of a different type of magnetic material;

FIG. 5 is a view similar to FIG. 1 but showing a modified arrangement for the dissimilar thermo-electric elements;

FIG. 6 is a cross sectional view taken on line 6—6 of FIG. 5 with the sensing coil removed;

Figure 1:
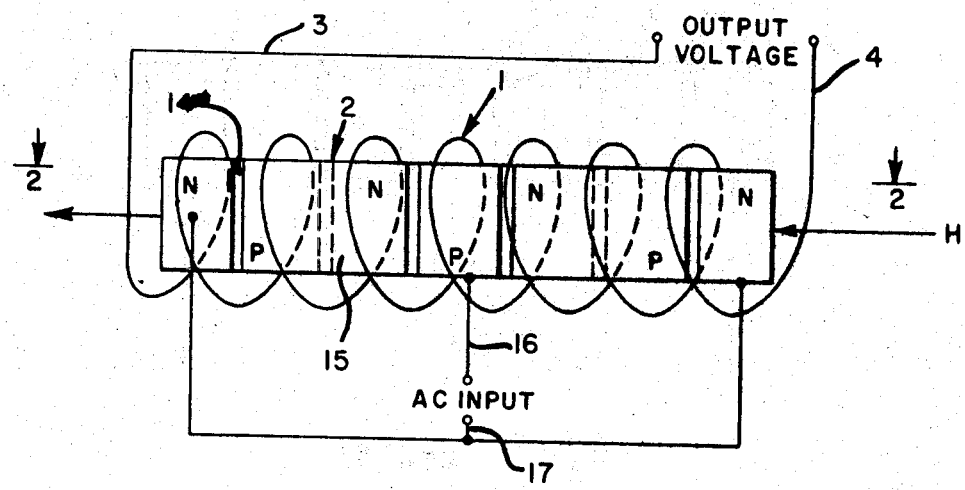
FIG. 1 is a partly schematic view showing one embodiment of a temperature gated flux-gate magnetometer according to the invention.
Figure 2:
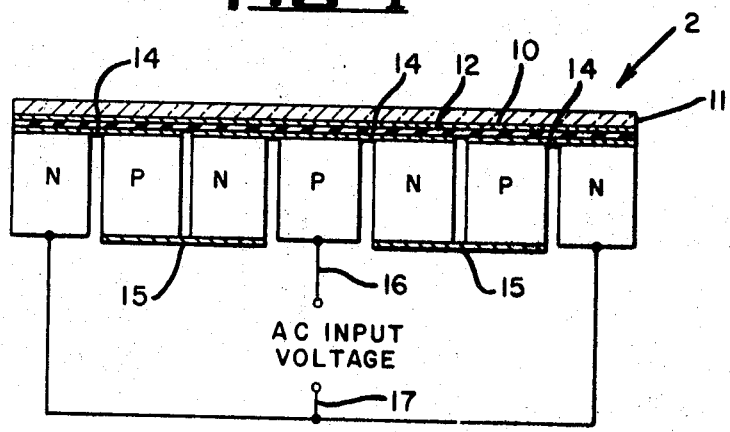
FIG. 2 is a sectional view of the core construction of FIG. 1, taken on line 2—2 of FIG. 1, with the sensing coil removed.

Referring now in more detail to the drawings, FIG. 1 discloses a temperature gated, flux-gate magnetometer comprising a sensing coil 1 surrounding a core construction 2. Another view of the core construction is shown in FIG. 2. The output voltage from the sensing coil can be measured in conventional manner across leads 3 and 4 coming from the ends of the sensing coil. As is well known to those skilled in the art, the purpose of the magnetometer is to measure the strength of an unknown magnetic field indicated by the letter H and the arrows in FIG. 1. As is also well known by those skilled in the art, any cange in the number of lines of magnetic flux passing through the coil 1 will generate a voltage in the coil. The magnitude of the voltage output E from the coil is given by the equation $$E = NA \frac{dB}{dt}$$

where N is the number of turns of coil 1, A is the cross-sectional area of the magnetic portion of the core, B is flux density, and $t$ is time. The relationship between the flux density, permeability and magnetic field intensity is $B = \mu H$; where $\mu$ is the effective permeability, and of course H is the unknown magnetic field intensity. Therefore, $$E = NAH \frac{d\mu}{dt}$$

and since N and A are known constants the output voltage E for a given rate of change of permeability will be a function of the unknown field H. The preceding discussion is merely a restatement of the principles which are applicable to all flux-gate magnetometers. The contribution of the present invention is related to the manner in which the permeability is made to change.

Figure 3:
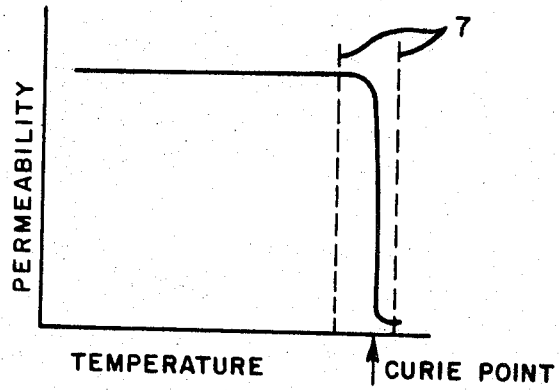
FIG. 3 is a graph of the permeability of a ferromagnetic material versus temperature.

Referring to FIGS. 3 and 4, it will be seen that permeability is a function of temperature in the temperature region adjacent the Curie point. Therefore, if the temperature of the magnetic material can be made to change as a function of time, the permeability will change as a function of time, and the voltage generated in the coil 1 will be a measure of the strength of the magnetic field H. More specifically, FIGS. 3 and 4 show the temperature characteristics of two different types of magnetic materials. FIG. 3 shows the temperature characteristic exemplary of ordinary magnetic material such as an iron, supermalloy and ferrites. Where a relatively low Curie point is desired, an alloy of 70% iron and 30% nickel or manganese-zinc ferrite is very suitable. FIG. 4 shows the characteristics of another known group of materials, namely, materials of the Cr-Modified $Mn_2$ Sb type. In each case the operation of the magnetometer requirs that the temperature of the magnetic material be changed through a temperature range near the Curie point, such as the temperature indicated between the dashed lines 7 in FIG. 3 and the temperature range between the lines 8 in FIG. 4. In both FIG. 3 and FIG. 4 the permeability of the material is substantially equal to unity at temperatures above the Curie temperature.

The way in which the temperature of the magnetic material is caused to change will now be described. Referring to FIGS. 1 and 2, the core construction 2 comprises a strip of magnetic material 10 and means for changing the temperature thereof. In order to make the temperature gated flux-gate sensitive and to obtain a large output, it is necessary to change the temperature rapidly so that the flux through the coil may vary rapidly. In other words, $dB/dt$ must be large. With ordinary methods of increasing and decreasing the temperature of an object, the object is first heated and then cooling is obtained by the flow of heat to a cooler object. This method produces slow changes compared to what can be produced by Peltier cooling and heating. As is well known to those skilled in the art, the Peltier effect is the action in which the flow of current across a junction of dissimilar thermoelectric metals causes heating of the junction when the current flow is in one direction and cooling of the junction when the current flow is in the other direction. In accordance with the present invention, an alternating current is passed through the dissimilar metals to abstract heat from the junction on one-half cycle and produce heat on the next half cycle. When the resistive heating, the $I^2R$, is kept low by keeping the resistance low, the cooling of the junction can be made nearly equal to the heating of the junction. Now, if the heat capacity or the amount of heat necessary to raise the temperature of the magnetic material is small, the temperature may be made to increase and decrease at a rapid rate.

Accordingly, in a preferred embodiment of the invention, the mass of the magnetic material 10 is made very small by utilizing a magnetic strip in the form of a thin film coated on a base member 11 which can be a piece of glass or other nonmagnetic material of low thermal conductivity. By way of example, the thickness of the coating of magnetic material can be in the order of $1 \times 10^{-4}$ centimeters. Obviously the thickness of the film 10 of magnetic material is exaggerated in the drawings in order to be visible. Any suitable, conventional method can be employed to place the coating 10 on the base 11. For example, vapor deposition techniques can be employed, and the magnetic material itself can be a material such as permalloy, supermalloy, or ferrite, preferably materials with a high permeability and a Curie temperature near ambient temperature.

The construction for utilizing the "Peltier" effect comprises alternate blocks of N-type material and P-type material as represented respectively by the letters N and P in FIGS. 1 and 2. In order to be able to vary the temperature of the magnetic material 10 rapidly, the material itself should be of low heat capacity as previously discussed and also the heat conductivity of the P and N blocks should be relatively low. Semiconductor materials for the P and N blocks provide a high efficiency in the proposed type of "Peltier" design because the termal conductivity K is low while at the same time the electrical resistivity R is low to make the figure of merit, $$Z = \frac{S^2}{RK}$$

high; where S is the Seebeck coefficient. By way of example the N-type material can be of a conventional Bi Te composition and the P-type material can be of a Zn Sb composition. Alternatively, the materials can be P and N type doped lead telluride.

In order to insulate the P and N blocks electrically from the magnetic strip, a thin insulating layer 12 is deposited on the magnetic material 10. The purpose of the insulation is to require the current to flow in series through the P and N blocks. If the magnetic material 10 is of high resistivity or sufficiently thin to provide a high enough resistance, the insulating layer 12 can be omitted. When the insulating layer is employed it is made of a good thermal conductor such as beryllium oxide to conduct the heat between the magnetic material and the Peltier junctions. In order to attach the P and N blocks to the insulation and to form the electrical junctions between the blocks, spaced metallic strips 14 are formed on the insulation 12 and the blocks are metallically bonded thereto. The metallic strips 14 can be conveniently formed by conventional metallizing procedures employed in the electron tube field. In order to form the junctions between the outer ends of the P and N blocks, small strips 15 of metal, such as copper, are metallically bonded in conventional manner to the adjacent surfaces of adjoining P and N blocks. In order to energize the P and N junctions, a source of alternating current input voltage is supplied across leads 16 and 17. Obviously, the current at the junctions 14 will then travel alternately in the P-N direction and then in the N-P direction, to modulate the temperature of the magnetic material.

Summarizing, a temperature gated flux-gate according to the invention uses a change of temperature in the magnetic core material 10 to change its permeability and thus vary the flux B proportional to the unknown magnetic field H with a resultant varying voltage induced in the sensing coil 2. The Peltier effect is employed to accomplish the required change in temperature in the magnetic material 10. Thus, when an alternating current is passed via the leads 16 and 17 through the P-N junctions, the junctions 14 are alternately cooled and heated in response to the change in direction of the flow of current through the junctions. In other words, the Peltier effect is used to oscillate the temperature of the magnetic material 10. If the magnetic material is held at an average temperature near the Curie temperature, the heating and cooling will cause the magnetic material to undergo substantial changes in permeability as indicated in FIGS. 3 and 4. For example, in FIG. 3 when the magnetic material is heated to the Curie point, it will have a permeability of 1 and when it is cooled through a relatively small temperature range it will rapidly increase to its normal permeability which may have a value of 1,000 or more. As previously explained, the change in permeability caused by the change in temperature will cause a voltage to be induced in the sensing coil 1, which voltage will be a measure of the unknown magnetic field H and can be read on conventional instrumentation. With the type of magnetic material shown in FIG. 3, the change in permeability and therefore flux will be of the same frequency as the current through the P-N junctions. When material having the same characteristics of the type shown in FIG. 4 is employed, it will undergo a change in flux twice for each half cycle of Peltier current instead of once per cycle. The output frequency in this case would contain a second harmonic of the driving current. It will of course be understood that it is necessary to maintain the average temperature of the magnetic core 10 near the Curie temperature in order that the relatively short thermal excursions caused by the thermal pulses delivered by the Peltier effect will be in the critical temperature range as shown by lines 7 and 8 in FIGS. 3 and 4. If the ambient temperature in which the magnetometer operates does not happen to be near the Curie temperature, then a variety of heating means might be utilized. For example, the magnetometer might be located in a small oven or exposed to the rays of a heat lamp.

FIG. 5 is a partly schematic view similar to FIG. 1 but showing a modified construction for the core unit. The construction of FIG. 5 comprises a sensing coil 1 having leads 3 and 4 as in the case of FIG. 1. In FIG. 5 and in subsequent figures elements which are the same as those employed in previous figures will be given the same reference numbers and elements which are similar to elements in earlier figures will be designated with the same reference numbers plus prime or subscript marks. In FIGS. 5 and 6 the core construction comprises a non-magnetic base 11 of a material such as glass as in the case of FIG. 1. However, in FIGS. 5 and 6 the magnetic material is not deposited directly on the glass base as in FIG. 1. Instead the thermo-electric materials themselves are also formed as thin films applied to the glass base, for example by vapor deposition. More specifically, one of the P-N materials is deposited directly on the glass base 11 and the other is deposited on the first. For example, the N-type material can be deposited first and is identified as $N_1$ in FIGS. 5 and 6. The P material identified as $P_1$ is then deposited on the $N_1$ layer. The magnetic film 10 is deposited on the layer $P_1$.

An alternating current source for energizing the Peltier junction is placed across leads 20 and 21. Lead 21 goes to a potentiometer 22 to equalize the right and left hand branches of current in order to make make the magnetic effect upon the sensing coil 1 equal to zero. The right end of the resistance element in potentiometer 22 is connected to the right end of the $P_1$ coating by lead 23, and the left end of the resistance element of the potentiometer is connected to the left end of the coating $P_1$ by a lead 24. The lead 20 from the AC input is connected through a potentiometer 25 to a DC power source 26 and thence to the center portion of the film $N_1$. A hole is provided in the glass base 11 in order to make the latter connection. The direct current flowing through the Peltier junction from the power source 26 can be automatically controlled by the potentiometer 25 to either heat or cool the junction and thus maintain the mean temperature of magnetic coating 10 at the Curie point. With this temperature point closely maintained, the cooling and heating excursions produced by the alternating current may be made most efficiently and at maximum effective frequency. It will be seen that in the construction of FIGS. 5 and 6 the Peltier elements $P_1$ and $N_1$ are of very little mass and thereby provide a very small thermal inertia. In addition there is good thermal connection between the magnetic material and the $P_1$-$N_1$ junction because of the very small thickness of $P_1$. Also the area of the $P_1$-$N_1$ junction is at least as large as the area of the face of the magnetic film 10. By way of example the $N_1$ and $P_1$ films may each have a thickness on the order of $5 \times 10^{-4}$ and the magnetic film 10 may have a thickness of $1 \times 10^{-4}$ as in the case of FIG. 1.

Figure 7:
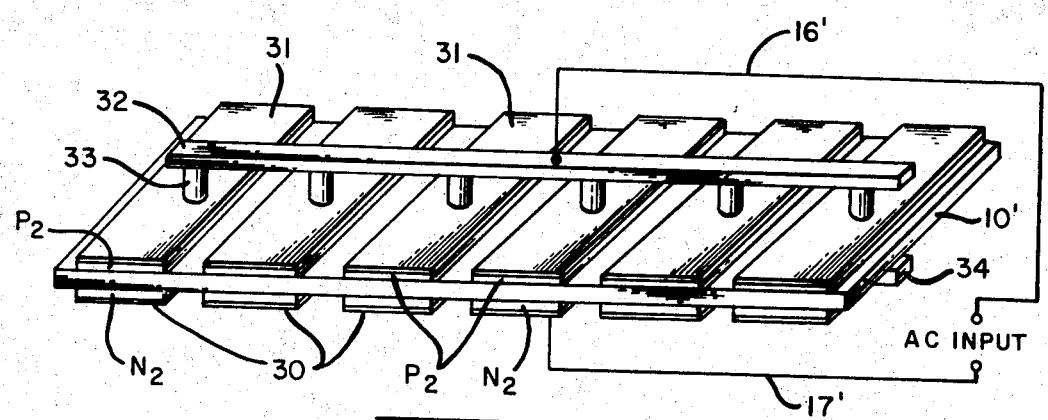
FIG. 7 is a perspective view of a modified core construction which can be used with a sensing coil such as shown in FIG. 1.
Figure 8:
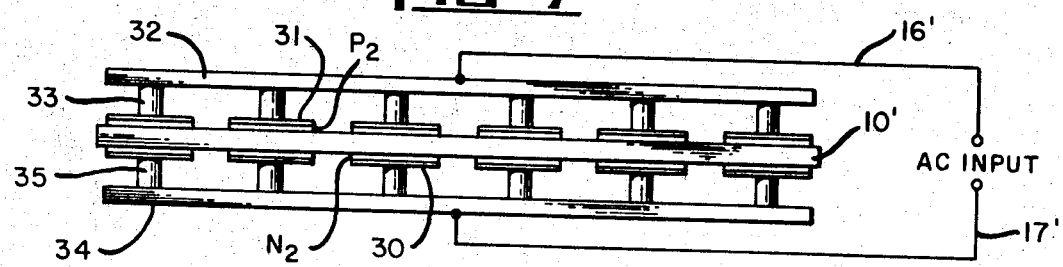
FIG. 8 is a side view of the core construction shown in FIG. 7.

FIGS. 7 and 8 disclose another embodiment for the magnetic core construction. In FIGS. 7 and 8 the magnetic core material 10' forms the electrical connection between the N and P type materials. The magnetic strip 10' can be thick enough to be self supporting or preferably it can be a very thin sheet supported by being held in tension between two end supports. The N type material is thinly deposited in strips on one side the magnetic core 10' and is designated $N_2$. Similarly, the P type material is thinly deposited in spaced strips on the other side of the core 10' and is designated $P_2$. In order to reduce the amount of resistance heating and in order to obtain good electrical flow distribution throughout the junction surfaces of the $N_2$ and $P_2$ strips, highly conductive coatings 30 and 31 are applied to the outer faces of the $N_2$ and $P_2$ layers, respectively. For example, the coatings 30 and 31 can be deposits of gold or silver. A connecting bar 32 with stand-off legs 33 is connected to the metallic coatings 31 as by brazing the ends of the legs 33 to the coatings. Similarly a connecting bar 34 with stand-off legs 35 interconnects the various metal coatings 30. Leads 16' and 17' connect the AC input to the bars 32 and 34 respectively. The core construction as shown in FIGS. 7 and 8 is of course surrounded by a sensing coil, such as the coil shown at 1 in FIG. 1, for operation as a magnetometer.

The arrangement of FIGS. 7 and 8 would of course function without the highly conductive coatings 30 and 31. However, in many cases the most suitable N and P type materials are relatively poor electrical conductors so that if the current had to flow from the center of each of the strips $N_2$ and $P_2$ along the length of the strips to their ends and then through the magnetic core 10', an appreciable amount of resistive heating would result. When it is desirable to avoid this resistive heating the highly conductive coatings 30 and 31 carry the current entirely across and along the faces of the $N_2$ and $P_2$ coatings so that current need flow through the $N_2$ and $P_2$ material only in the direction of their thicknesses which are extremely small. The embodiment of FIGS. 7 and 8 have high thermal transfer efficiency from the Peltier junction because the junctions surfaces of the N and P type materials are in direct contact with the magnetic material.

Figure 9:
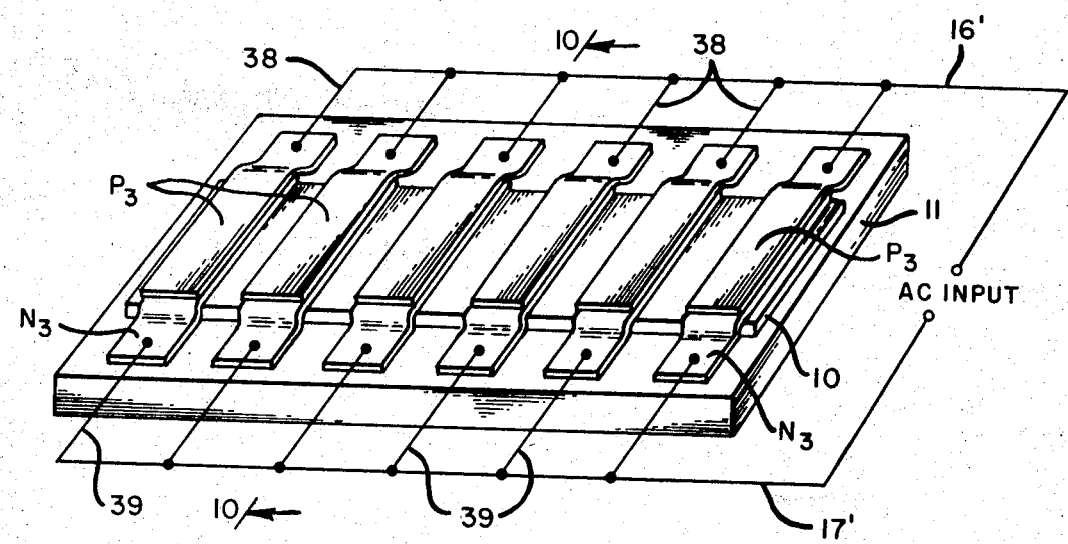
FIG. 9 is a perspective view similar to FIG. 7 but showing a further embodiment for the core construction.
Figure 10:
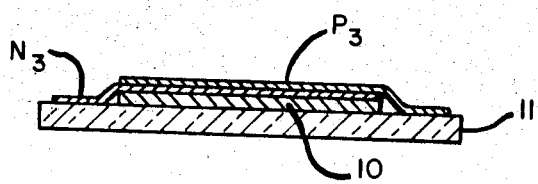
FIG. 10 is a cross sectional view taken on the line 10—10 of FIG. 9.

FIGS. 9 and 10 show a further embodiment of a core construction. The embodiment of FIGS. 9 and 10 comprises a base strip 11 of glass as in the embodiments of FIGS. 1 and 5. Also, the magnetic core strip 10 is in the form of a thin film as in the embodiments of FIGS. 1 and 5. The magnetic strip 10 is deposited directly on the glass, and the dissimilar Peltier elements are deposited over the glass and magnetic coating in the following manner. A series of spaced strips of N or P type material are first deposited on the magnetic layer and extending beyond the magnetic layer onto the glass base along one edge of the magnetic layer. For example, the N type material is deposited first and is designated $N_3$ in the drawings. Next the other dissimilar material is deposited in strips on top of the first deposited strips. For example, the P type material is deposited second and is designated $P_3$ in the drawings. As will be apparent from the drawings the P type strips are made to extend beyond the edges of the underlying N type strips and magnetic layer along the edge of the magnetic layer opposite the edge on which the N type strips extend outwardly. Thus it is easy to connect the alternating current input leads 16' and 17' to the $P_3$ and $N_3$ strips respectively by means of short connecting leads 38 and 39 respectively.

Figure 11:
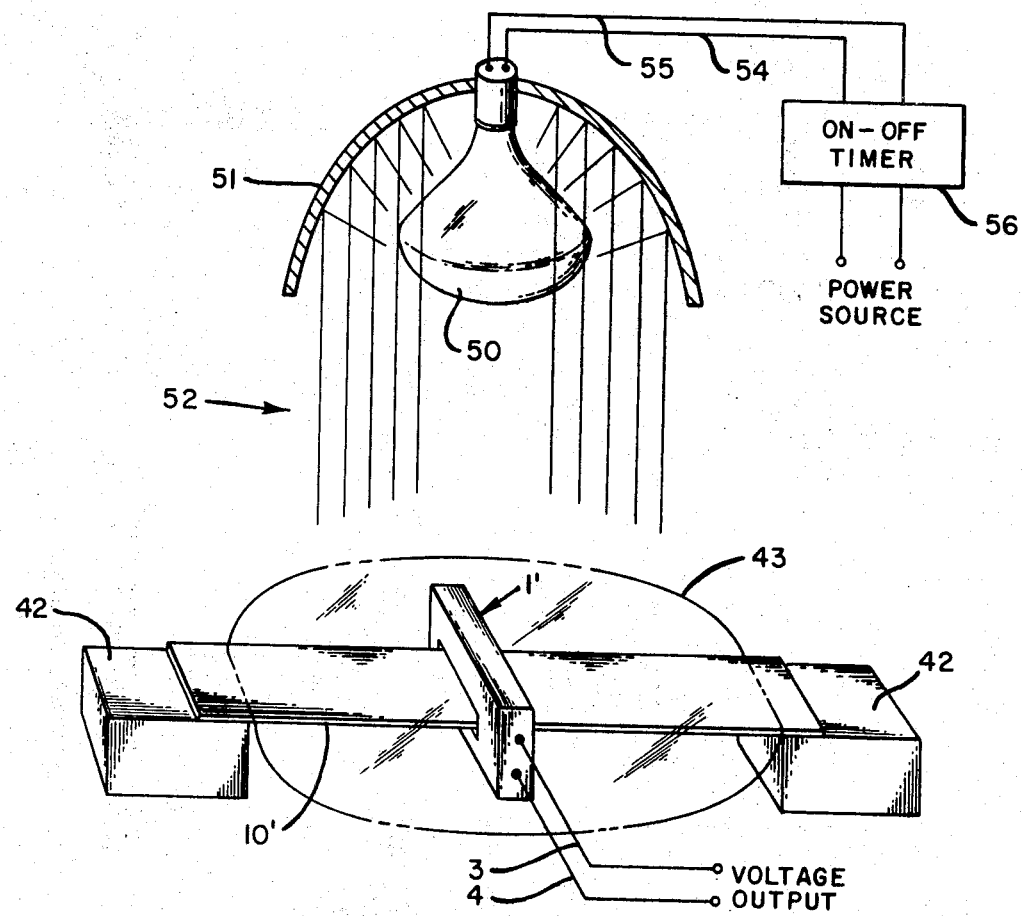
FIG. 11 is a generally schematic view partly in perspective showing a modified form of the invention which employs radiant heat energy rather than the Peltier effect.
Figure 12:
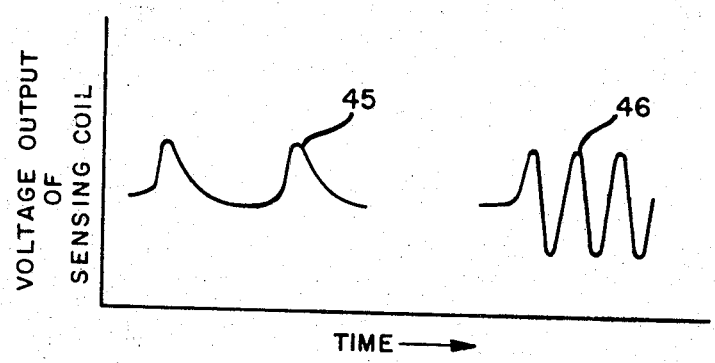
FIG. 12 is a graph showing a comparison between an exemplary output curve from the sensing oil of FIG. 11 and the coil of any of the other embodiments.

FIG. 11 shows a magnetometer embodying the principles of the invention wherein the magnetic core is thermally pulsed by means other than a Peltier arrangement. In FIG. 11 the magnetic core is heated by radiant energy instead of by the Peltier effect. One aspect of the arrangement of FIG. 11 is that there is no nearby electrical current involved to influence the output of the magnetometer. In FIG. 11 the magnetic strip 10' can be a thin foil construction attached to two highly conductive end blocks 42 which form heat sinks. In a preferred form the magnetic strip is enclosed in an evacuated glass envelope indicated by the dot dash line 43. The magnetic strip 10' is encircled by a conventional sensing coil construction 1'. The output of the coil can be measured in conventional manner across leads 3 and 4. The time between output pulses from the coil 1' in FIG. 11 will of course tend to be longer than in the other embodiments because in FIG. 11 there is no separate cooling pulse. As a result, it will normally take longer for the magnetic material to cool down and become ready for the next heating pulse. In addition, the cooling in FIG. 11 can be so much slower than in the other embodiments that little if any voltage output will result during the cooling step. For example, curve 45 in FIG. 12 is exemplary of the voltage output in FIG. 11, and curve 46 is exemplary of the output from the other embodiments, all for magnetic material of the type represented in FIG. 3.

The heat source for the embodiment of FIG. 11 is a conventional heat bulb 50. The bulb 50 is located in a reflector 51 in order to concentrate the radiant energy rays 52 on the magnetic strip 10'. A laser could of course be substituted for bulb 50 and reflector 51. The bulb 50 is connected by leads 54 and 55 to a power source through a conventional on-off timer 56. Timer 56 is set to provide operating current to bulb 50 for a sufficient time to cause the magnetic strip 10' to heat up to substantially the Curie point or considerably beyond it. Then the timer cuts the current off for a sufficient time to allow the magnetic strip to cool down substantially below the Curie point. Next the timer switches the current back on and the cycle is repeated. For example, the temperature of the magnetic material can be heated and then allowed to cool in the range between lines 7 and 8 in FIGS. 3 and 4. However, the magnitude of the heat pulse may be made more intense so as to drive the temperature of the magnetic material substantially higher than regions 7 and 8, thus moving the magnetic permeability rapidly through the Curie temperature and producing a larger value of $dB/dt$. A higher voltage output pulse, or more sensitivity, can be achieved by this technique. A limitation to the overshoot temperature of course exists in the property of the magnetic material and the temperature above which it will not produce repetitive results. Increased sensitivity is achieved at the sacrifice of the frequency at which data pulses may be recorded since a large temperature overshoot requires a longer time for the magnetic material to cool below the Curie temperature.

Although preferred embodiments of the present invention are shown and described herein, it is to be understood that modifications may be made therein without departing from the spirit and scope of the invention as set forth in the appended claims.

Having thus described the invention, what is claimed as new and desired to be secured by Letters Patent is:

1. A sensor for measuring an external magnetic field comprising a planar sheet of magnetic material whose permeability changes greatly in response to relatively small changes in temperature of said material, a thin coating of one thermo-electric material on said magnetic material and a thin coating of a dissimilar thermo-electric material positioned to form a thermoelectric junction with said one thermo-electric material, said thermoelectric junction being thermally coupled to said magnetic material, and means disposed about said magnetic material for producing an output signal proportional to said magnetic field.

2. A sensor as claimed in claim 1 in which said magnetic material is a thin coating and said magnetic material has a base having a thermal conductivity which is low relative to that of the magnetic material.

3. A sensor as claimed in claim 1 in which said dissimilar thermo-electric materials are coated on opposite sides of said magnetic material.

4. A sensor as claimed in claim 1 in which said dissimilar thermo-electric materials are coated one on top of the other on one side of said magnetic material.

5. A sensor as claimed in claim 1 further comprising electrical connections to said dissimilar thermo-electric coatings so arranged that current will flow through said thermo-electric coatings in opposite directions and the current paths will be of equal length.

6. Apparatus for measuring an unknown external magnetic field comprising magnetic material and a planar base member of low thermal conductivity relative to said magnetic material, said magnetic material being a thin coating on said base member and being subject to substantial change in permeability in response to relatively small changes in temperature of said material, dissimilar thermo-electric elements electrically connected to each other to form a thermo-electric junction thermally coupled to said magnetic material, and means disposed about said magnetic material for producing an output signal which is a function of said external magnetic field.

7. Apparatus as claimed in claim 6 in which said thermo-electric elements are blocks of dissimilar thermo-electric material spaced alternately along said magnetic material and electrically connected in series.

8. Apparatus for measuring an external magnetic field comprising a planar sheet of magnetic material whose permeability changes greatly in response to relatively small changes in the temperature of said material within a specific temperature range, means for oscillating the temperature of said magnetic material in said specific range comprising dissimilar thermo-electric elements electrically connected to each other and thermally coupled to said magnetic material, and means around said magnetic material for generating an output voltage, said voltage being proportional to said magnetic field.

9. Apparatus as claimed in claim 8 wherein said temperature oscillating means includes alternating-current power supply means connected to said thermo-electric elements.

10. A device for measuring an unknown magnetic field comprising a planar sheet of magnetic material having a permeability of unity at and above its Curie temperature, said permeability of said magnetic material being greater than unity when said material temperature is less than the Curie temperature, a sensing coil surrounding said magnetic material, and means for periodically alternating the temperature of said magnetic material above and below said Curie temperature whereby said permeability is periodically alternated comprising dissimilar elements electrically connected to each and thermally coupled to said magnetic material and A-C power supply means connected to said elements whereby said magnetic material is alternately Peltier heated and Peltier cooled, a voltage proportional to said unknown field being induced in said sensing coil when said coil is placed in said magnetic field.

References Cited
UNITED STATES PATENTS

| | | | |
|---|---|---|---|
| 2,222,425 | 11/1940 | Wehe | 335—217X |
| 3,271,665 | 9/1966 | Castro et al. | 324—43 |
| 2,446,939 | 8/1948 | MacCallum | 324—43 |
| 3,090,207 | 5/1963 | Smith et al. | 310—4 |
| 3,244,974 | 4/1966 | Dumin | 324—46 |

OTHER REFERENCES

PB Report 131,411, "Unconventional Electrical Power Sources," by Betts & McCollum (September 1954, pp. I-4, I-5).

A. E. SMITH, Primary Examiner

U.S. Cl. X.R.

335—217